United States Patent
Wang

(10) Patent No.: US 7,813,527 B2
(45) Date of Patent: Oct. 12, 2010

(54) METHOD AND SYSTEM FOR OBJECT DETECTION IN AN IMAGE PLANE

(75) Inventor: Wen-Hao Wang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 925 days.

(21) Appl. No.: 11/669,942

(22) Filed: Jan. 31, 2007

(65) Prior Publication Data

US 2008/0101653 A1    May 1, 2008

(30) Foreign Application Priority Data

Oct. 30, 2006  (TW) .............................. 95140053 A

(51) Int. Cl.
*G06K 9/00* (2006.01)
(52) U.S. Cl. ................... 382/103; 382/100; 382/173
(58) Field of Classification Search ............. 382/100, 382/103, 173, 224; 705/35, 37; 356/71
See application file for complete search history.

(56) References Cited

U.S. PATENT DOCUMENTS

| | | | |
|---|---|---|---|
| 5,099,322 A | 3/1992 | Gove | 358/105 |
| 5,986,746 A * | 11/1999 | Metz et al. | 356/71 |
| 6,999,601 B2 | 2/2006 | Pavlovic et al. | |
| 6,999,604 B1 | 2/2006 | Kim et al. | 382/107 |
| 7,200,266 B2 * | 4/2007 | Ozer et al. | 382/173 |
| 7,590,589 B2 * | 9/2009 | Hoffberg | 705/37 |
| 2004/0017938 A1 | 1/2004 | Cooper et al. | 382/171 |
| 2004/0086152 A1 | 5/2004 | Kakarala et al. | 382/103 |
| 2005/0047646 A1 | 3/2005 | Jojic et al. | |
| 2005/0111696 A1 | 5/2005 | Baer | 382/103 |

FOREIGN PATENT DOCUMENTS

JP    61003591    1/1986

OTHER PUBLICATIONS

Applying Discriminative Hidden Markov Models to Face Recognition, Chien-Chung Wang, Jun. 2005.
HMMs (Hidden Markov Model) Application on Feature Mapping from Audio Signals to Visual Signals, Kuang-Yi Wang, Jun. 2005.
Head gesture recognition by using the hidden HMM (Hidden Markov Model), Chao-Chun Yu, Jun. 2006.
Virtual Mouse: Vision-Based Gesture Recognition, Chih-Yu Chen, Jun. 2003.

* cited by examiner

*Primary Examiner*—Anh Hong Do

(57) ABSTRACT

Disclosed is an object detection method and system in an image plane. A Hidden Markov Model (HMM) is employed and its associated parameters are initialized for an image plane. Updating HMM parameters is accomplished by referring to the previous estimated object mask in a spatial domain. With the updated HMM parameters and a decoding algorithm, a refined state sequence is obtained and a better object mask is restored from the refined state sequence. Consequently, estimation of the HMM parameters can be rapidly achieved and robust object detection can be effected. This allows the resultant object mask to be closer to the real object area, and the false detection in the background area can be decreased.

14 Claims, 6 Drawing Sheets

METHOD AND SYSTEM FOR OBJECT DETECTION IN AN IMAGE PLANE

FIELD OF THE INVENTION

The present invention generally relates to a method and system for object detection in an image plane.

BACKGROUND OF THE INVENTION

Object detection plays an important role in many video applications, such as computer vision, and video surveillance systems. In general, object detection is one of the major factors for the success of video systems.

Japan Patent No. 61003591 disclosed a technique for storing background picture in the first picture memory, and store image containing objects in the second picture memory. By subtracting the data in these two picture memories, the result is the scene change, where the objects are.

U.S. patent and publication documents also disclosed several techniques for object detection. For example, U.S. Pat. No. 5,099,322 uses an object detector to detect abrupt changes between two consecutive images, and uses a decision processor to determine whether scene changes occur by means of feature computing. U.S. Pat. No. 6,999,604 uses a color normalizer to normalize the colors in an image, and uses a color transformer for color transformation so that the image can be enhanced and the area suspected of an object is enhanced to facilitate object detection. Finally, a comparison against the default color histogram is performed, and a fuzzy adaptive algorithm is used to find the moving object in the image.

U.S. Patent Publication No. 2004/0017938 disclosed a technique with a default color feature of objects. During detection, anything that matches the default color feature is determined to be an object. U.S. Patent Publication No. 2005/0111696 disclosed a technique with long exposure to capture the current image at a low illumination, and comparing the current image against the previous reference image to detect the changes. U.S. Patent Publication No. 2004/0086152 divides the image into blocks, and compares the current image block against the previous corresponding image block for the difference of frequency domain transformation parameter. When the difference exceeds a certain threshold, the image block is determined to have changed.

Gaussian Mixture Model (GMM) is usually used for modeling each pixel or region to make the background model adaptive to the changing illumination. Those pixels that do not fit the model are considered as foreground.

Dedeoglu Y. disclosed an article in 2005, "Human Action Recognition Using Gaussian Mixture Model Based Background Segmentation," using Gaussian Mixture Model to perform real-time moving object detection.

Hidden Markov Model (HMM) is used for modeling a non-stationary process, and uses the time-axis continuity constraint in the continuous pixel intensity. In other words, if a pixel is detected as foreground, the pixel is expected to stay as foreground for a period of time. The advantages of HMM are as follows. (1) Selection of training data is not required, and (2) Using different hidden states to learn the statistical characteristics of foreground and background from a mixed sequence of foreground symbols and background symbols.

An HMM can be expressed as $H:=(N,M,A,\pi,P_1,P_2)$, where N is the number of states, M is the number of symbols, A is the state transition probability matrix, $A=\{a_{ij}, i,j=1, \ldots N\}$, $a_{ij}$ is the transiting probability from state i to state j, $\pi=\{\pi_1, \ldots, \pi_N\}$, $\pi_i$ is the initial probability of state i, and $P=(p_i, \ldots, p_n)$, $p_i$ is the probability of state i.

J. Kato presented a technique in the article, "An HMM-Based Segmentation Method for Traffic Monitoring Movies," IEEE Trans. PAMI, Vol. 24, No. 9, pp. 1291-1296, 2002, using a grey scale to construct an HMM on the time axis for each pixel. There are three states for each pixel, i.e. background state, foreground state, and shadow state, for detecting objects.

FIG. 1 shows a schematic view of a flowchart of a conventional HMM. As shown in FIG. 1, a conventional HMM procedure includes three steps: (1) initializing HMM parameters, as shown in step 101; (2) training stage, that is, estimating and updating the HMM parameters through Baum-Welch algorithm, as shown in step 103; and (3) using Viterbi algorithm and the HMM parameters from the previous step to estimate the state for input data (foreground state and background state), as shown in step 105. Baum-Welch algorithm is used for training HMM parameters.

Using Baum-Welch algorithm, the state transition probability matrix A, the initial probability $\pi_i$ of each state i, and the probability $p_i$ of each state i can be trained from the previous sample and updated. The Baum-Welch algorithm is an iterative likelihood maximization method. Therefore, it is time-consuming for estimating and updating the HMM parameters.

SUMMARY OF THE INVENTION

Examples of the present invention may provide a method and system for object detection in an image plane. The present invention uses HMM to improve the robustness of the object mask in image spatial domain. The object mask obtained at the previous time is used to assist in estimating the HMM parameters at the current time. HMM is then used to estimate the background and foreground (object) at the current time with stable and robust object detection effect. The object mask at the current time is closer to the actual object range, and the false detection in foreground and background can be decreased.

The present invention constructs an HMM model for each image, unlike the conventional techniques having an HMM model for each pixel. The present invention uses two states, the foreground state and the background state. The shadow problem is solved by the fusion of the result of GMM on luma and the result of GMM on chroma.

Accordingly, the method for object detection in an image plane of the present invention includes the following steps. First, an HMM model is constructed for an image, and the HMM parameters are initialized. Then, an object mask $\Omega_{f_b}(t-1)$ at the previous time is used to assist in updating the HMM parameters at the current time. Based on the HMM parameters at the current time, the object mask at the current time can be restored from states which are obtained by a decoding algorithm.

In the present invention, the HMM model can be expressed as $H:=(N,M, A,\pi, P_1,P_2)$, where N=2 (two states), i.e., $S_1$ is the foreground state and $S_2$ is the background state, M=2 (two symbols), i.e., background symbol $\beta$ and foreground symbol $\alpha$, $P_1$ and $P_2$ are the probability density function (PDF) for $S_1$ and $S_2$, respectively. $P_1(x=\alpha)$ is the probability that foreground symbol occurs during the background situation, and $P_1(x=\beta)$ is the probability that background symbol occurs during the background situation. On the other hand, $P_2(x=\alpha)$ is the probability that foreground symbol occurs during the foreground situation, and $P_2(x=\beta)$ is the probability that background symbol occurs during the foreground situation.

Therefore, the examples of the system for object detection in an image plane of the present invention may be realized by an HMM, a parameter estimation unit, a state estimation unit, a unit for restoring states to an object mask, and a delay buffer.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 1:
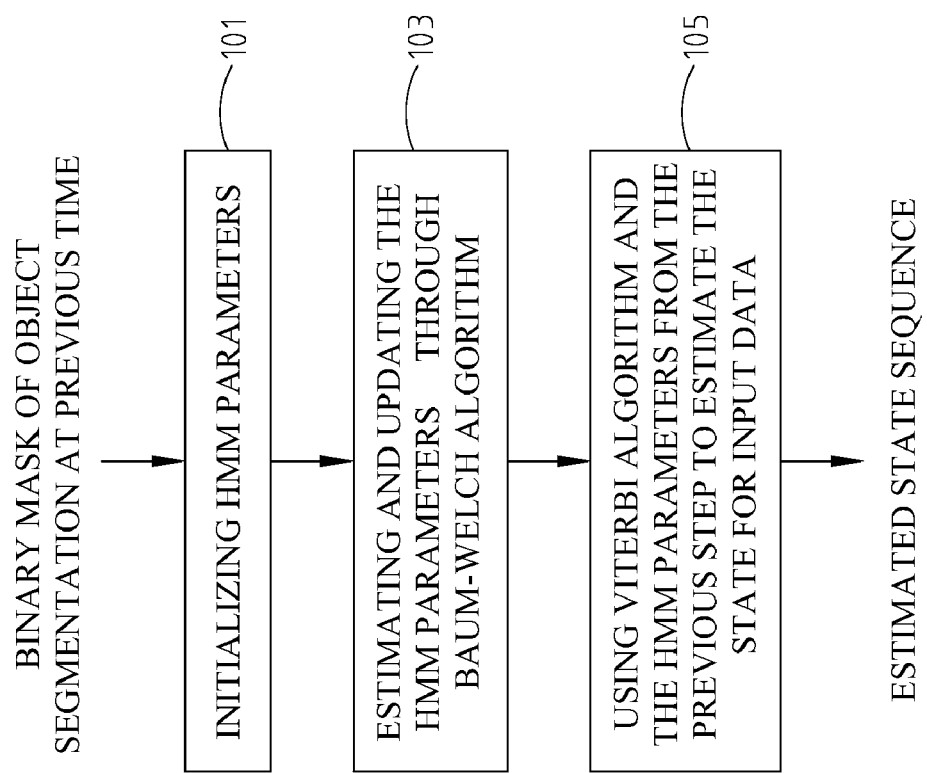
FIG. 1 shows a schematic view of a flowchart of a conventional HMM.
Figure 2:
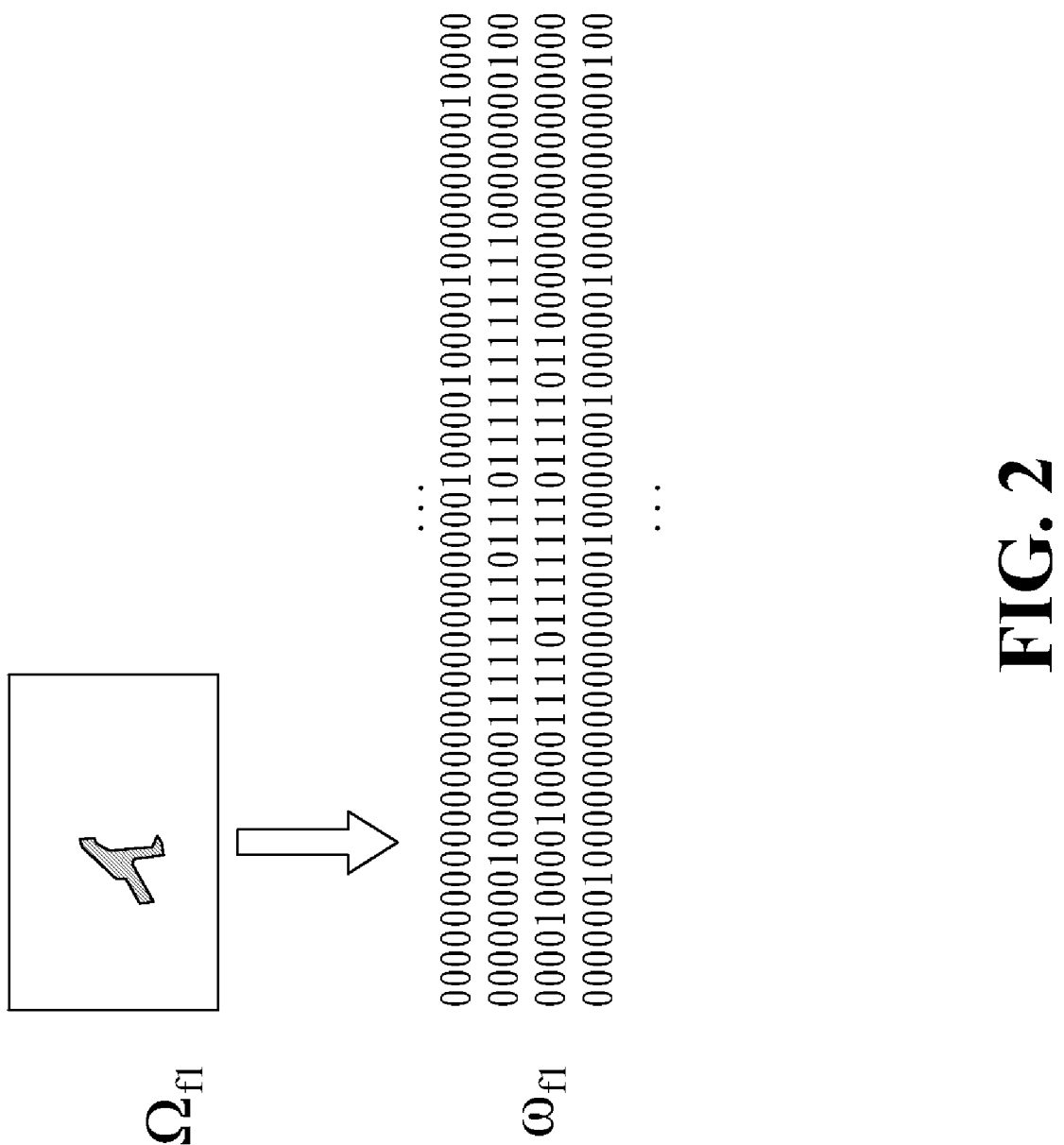
FIG. 2 shows a two-dimensional representation of an object mask corresponding to an image being expressed by a one-dimensional signal.

FIG. 2 shows a two-dimensional representation of an object mask corresponding to an image being expressed by a one-dimensional signal, where $\Omega_{f1}$ is the two-dimensional representation of an object mask corresponding to an image. The one-dimensional signal representation $\omega_{f1}$, called 1D sequence, for the object mask of the image, can be considered as a non-stationary random process including a plurality of states and each state having its own subprocess. In the example of the one-dimensional signal representation $\omega_{f1}$, symbols '0' and '1' respectively represent foreground and background for the image.

Figure 3:
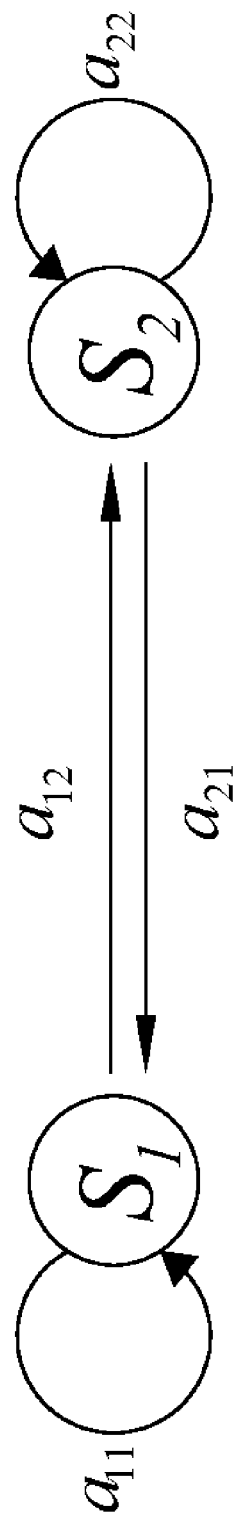
FIG. 3 shows a state diagram of the states used in the HMM of the present invention.

The 1D signal representation has two states. As shown in FIG. 3, $S_1$ is the background state and $S_2$ is the foreground state. Each state is a Markov chain with stationary statistics. Therefore, the signal characteristics of an object mask, i.e., a one-dimensional random process $\omega_{f1}$ represented by an 1D sequence, can be represented by an HMM model.

The HMM is expressed as $H:=(N,M,A,\pi,P_1,P_2)$, where $N=2$, i.e., $S_1$ is the background state and $S_2$ is the foreground state, $M=2$, i.e., background symbol $\beta$ and foreground symbol $\alpha$, A is the state transition probability matrix, $A=\{a_{ij}, i,j=1, \ldots N\}$, $a_{ij}$ is the transition probability from state i to state j, $\pi=\{\pi_1, \ldots, \pi_N\}$, $\pi_i$ is the initial state probability of state i, and $P_1$ and $P_2$ are the probability density function (PDF) for $S_1$ and $S_2$, respectively. $P_1(x=\alpha)$ is the probability that foreground symbol occurs during the background situation, and $P_1(x=\beta)$ is the probability that background symbol occurs during the background situation. On the other hand, $P_2(x=\alpha)$ is the probability that foreground symbol occurs during the foreground situation, and $P_2(x=\beta)$ is the probability that background symbol occurs during the foreground situation.

Therefore, in FIG. 3, $a_{12}$ is the transition probability from background state $S_1$ to foreground state $S_2$, $a_{21}$ is the transition probability from foreground state $S_2$ to background state $S_1$, $a_{11}$ is the transition probability from background state $S_1$ to background state $S_1$, and $a_{22}$ is the transition probability from foreground $S_2$ to foreground state $S_2$.

Figure 4:
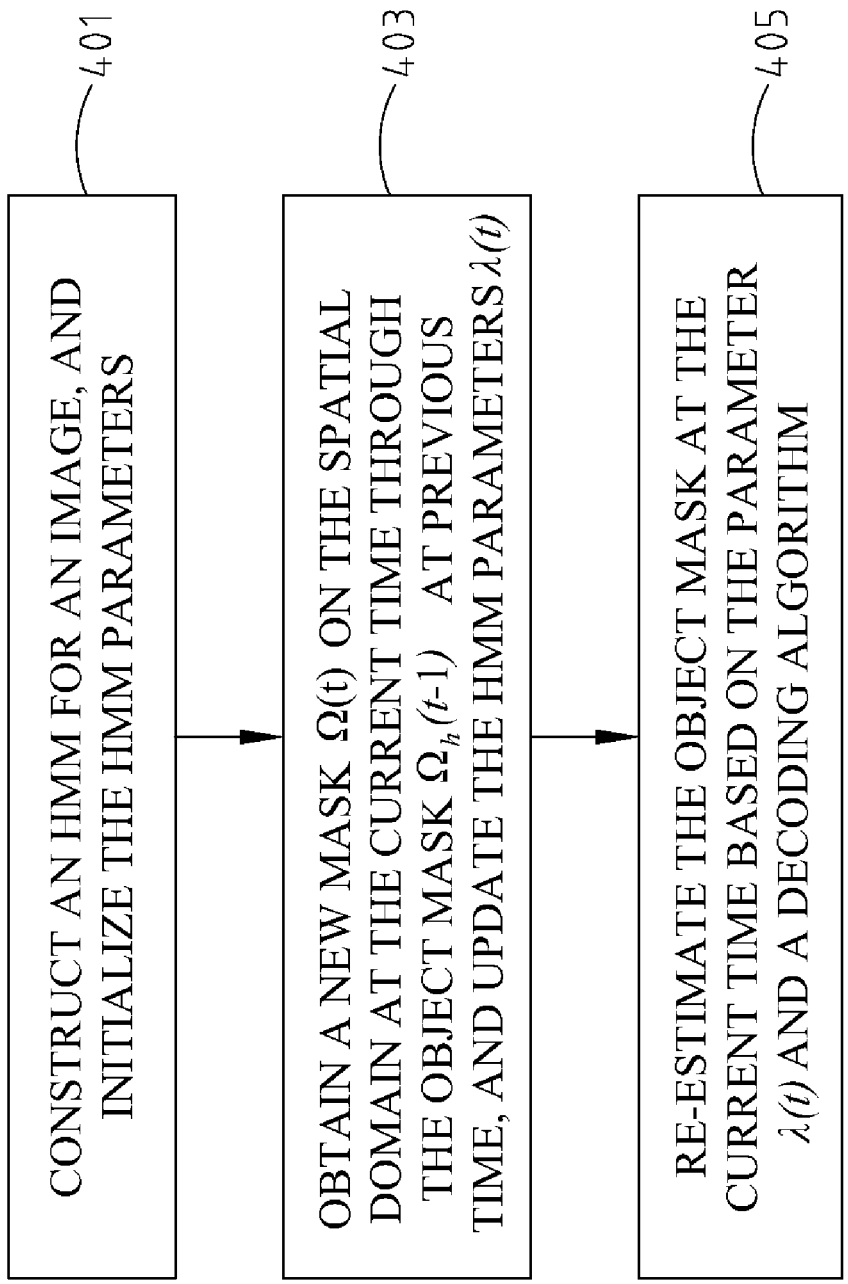
FIG. 4 shows a flowchart illustrating the steps for object detection in an image plane of the present invention.

To rapidly estimate the HMM parameters, the present invention transforms a re-estimating background mask problem into an HMM training problem by using a new method in the existent HMM training stage to obtain HMM parameters. FIG. 4 shows a flowchart illustrating the operating steps for object detection in an image plane of the present invention.

As shown in FIG. 4, the present invention first constructs an HMM for the current image, and initializes the HMM parameters, as shown in step 401. Then, step 403 is to obtain a new mask $\Omega(t)$ on the spatial domain at the current time through the object mask $\Omega_h(t-1)$ at previous time, and update the HMM parameters $\lambda(t)$. Step 405 is to re-estimate the object mask at the current time based on the parameter $\lambda(t)$ and a decoding algorithm.

Figure 5:
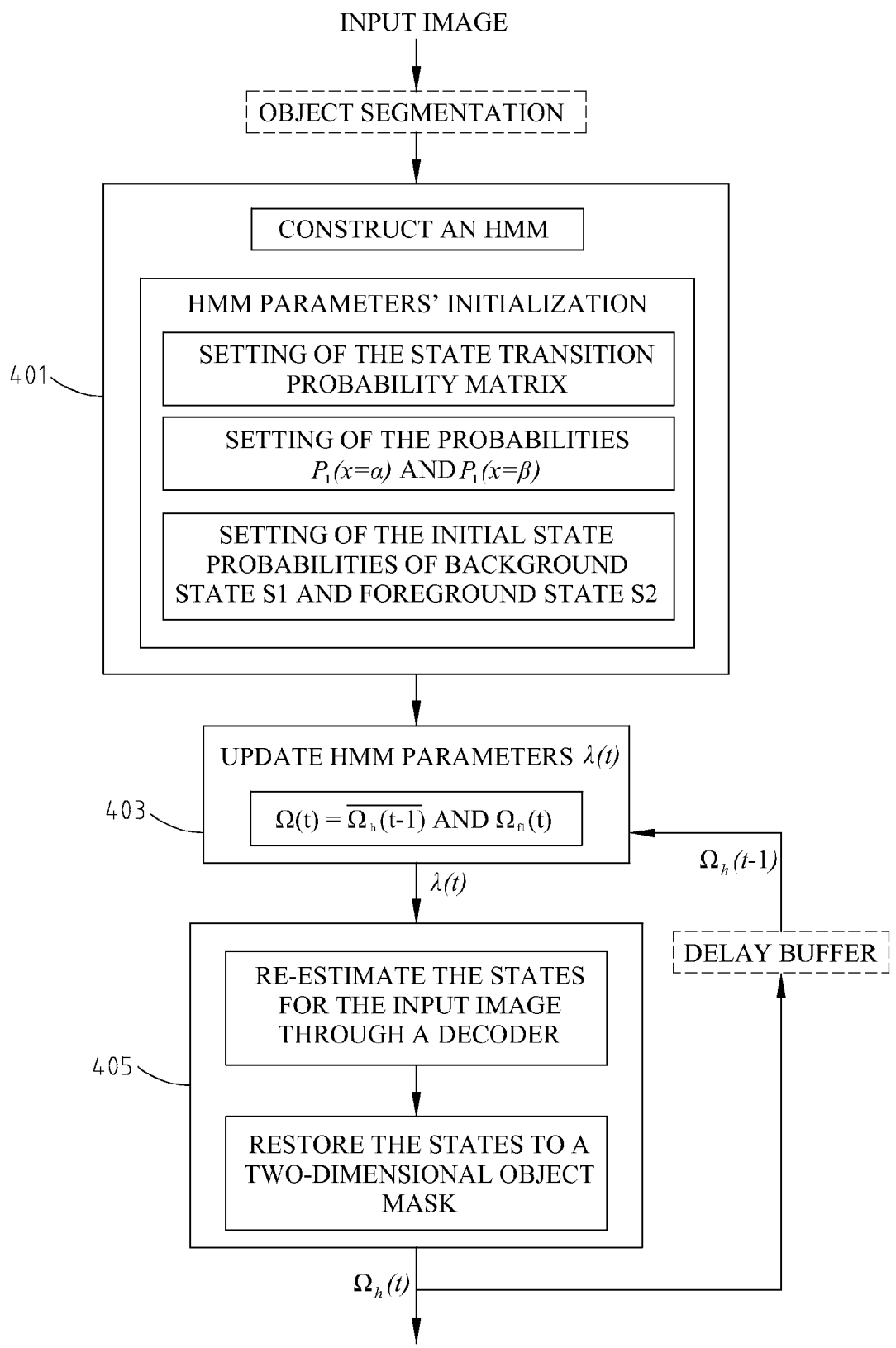
FIG. 5 shows a schematic view of a block diagram further describing the steps in FIG. 4.

FIG. 5 shows a schematic view of a block diagram further describing the steps in FIG. 4. As shown in FIG. 5, after performing the object segmentation procedure on the current input image, the initialization of HMM parameters in step 401 includes the setting for the state transition probability matrix, the probabilities of $P_1(x=\alpha)$ and $P_1(x=\beta)$, and the initial state probabilities of background state $S_1$ and foreground state $S_2$. It is worth noting that for the state transition probability matrix $\{a_{ij}, i,j=1,2\}$, when $i \neq j$, $a_{ii} > a_{ij}$.

In step 403, the mask $\Omega(t)$ to be updated represents the binary mask of subtracting foreground mask $\Omega_h(t-1)$ at previous time t-1 from a foreground mask $\Omega_{f1}(t)$; that is, $\Omega(t)= \overline{\Omega_h(t-1)}$ AND $\Omega_{f1}(t)$. Let $\xi$ denote the occupy-ratio of foreground symbol in $\Omega(t)$, the probability of foreground symbol can be approximated as $P_1(x=\alpha)=\xi$. Therefore, the probability of background symbol in background state is $P_1(x=\beta)=1-P_1(x=\alpha)$. The HMM parameters can be updated using the above approximation.

After having the updated HMM parameters, the object mask $\Omega_h(t-1)$ at the previous time is read in a one-dimensional way, either vertically or horizontally, as shown in step 405. A decoding technique, such as Viterbi decoding algorithm, is used to re-estimate the state of $\Omega_{f1}(x,y,t)$, where $\Omega_{f1}(x,y,t)=1$ if at time t, the pixel (x,y) of the input image (x,y) belongs to the foreground, and $\Omega_{f1}(x,y,t)=0$ or if at t, the pixel (x,y) of the input image belongs to the background.

In other words, the statistic model of the background is estimated. If some part (fusion of the foreground and background symbols) of $\Omega_{f1}(t)$ matches the background statistic model, the part will be recognized as background. The estimated $\Omega_{f1}(x,y,t)$ with one-dimensional states will be restored to two-dimensional object mask of the same size as the original image. Therefore, the object mask $\Omega_{f1}(t)$ is refined, and results in a better object mask.

According to the present invention, in step 405, the reading of the previous object mask $\Omega_h(t-1)$ and the updating of the new mask $\Omega(t)$ can be performed in different scale options. The two common scales are scale=1 and scale=2. If the original resolution of the input signal is used in execution, the scale is set to be 1. If the original input signal is down-sampled to $\Omega'(t)$ for replacing the $\Omega(t)$ in estimating the HMM parameters $\lambda(t)$, the scale is said to be 2. When scale=2, the refined state sequence is denoted as $\Omega'_h(t)$ which must be up-sampled to the object mask $\Omega''_h(t)$ (with original size) during the HMM procedure. According to the experimental results, the object mask obtained when scale=2 will lead to more robust object mask, and be closer to the actual object.

The present invention uses only two states, the foreground state and the background state. The shadow can be removed from the object mask by means of fusion of the results of GMM on luma and the results of GMM on chroma.

Figure 6:
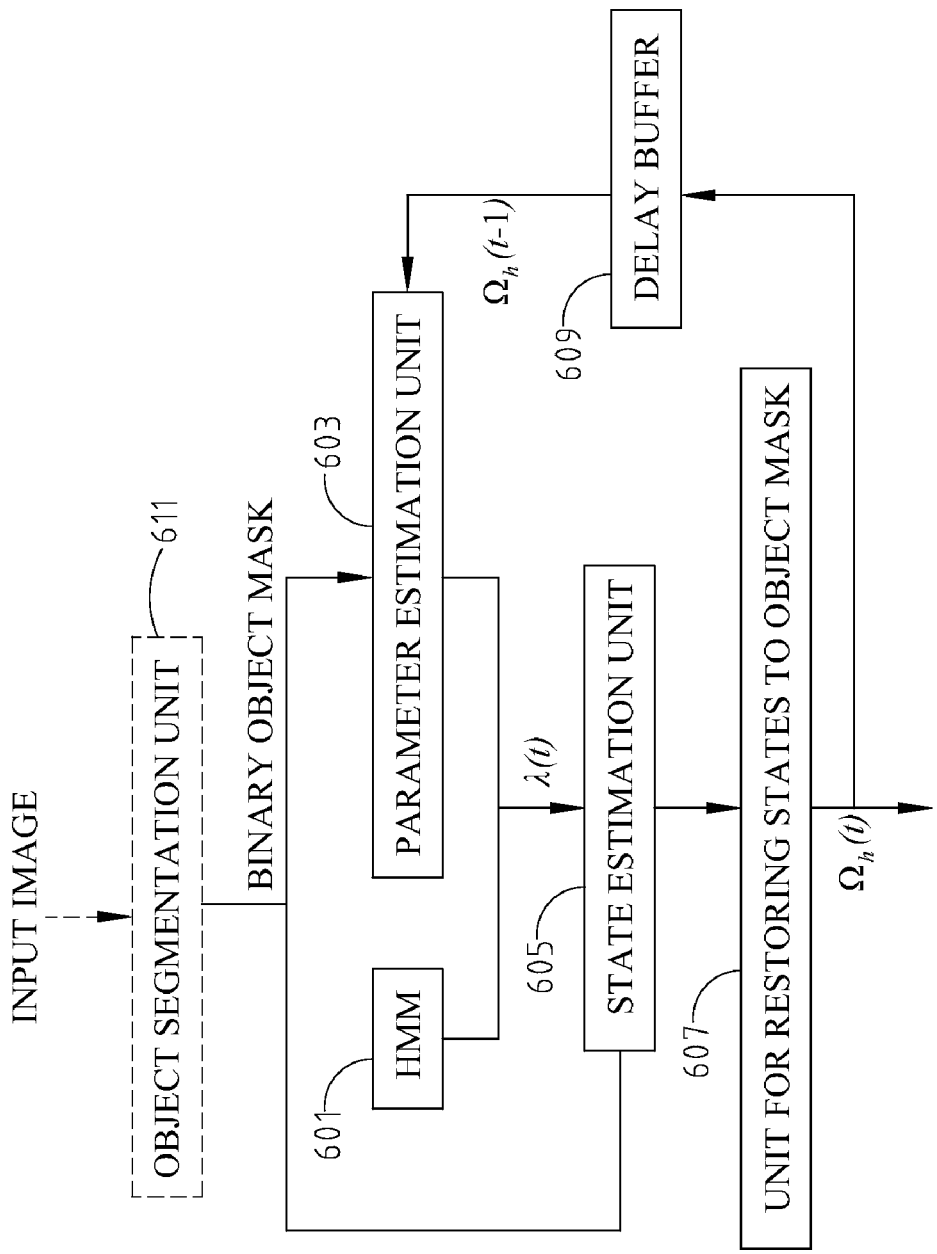
FIG. 6 shows a schematic block diagram of the system of the present invention.

FIG. 6 shows a schematic block diagram of the system of the present invention. As shown in FIG. 6, a system for object detection in an image plane includes an HMM 601, a parameter estimation unit 603, a state estimation unit 605, a mask restoration unit 607 for restoring states to an object mask, and a delay buffer 609.

The HMM 601 is initialized to H:=(N,M,A,π,$P_1$,$P_2$), and is coupled with an object segmentation unit 611. The parameter estimation unit 603 uses the object mask $\Omega_h$(t−1) at previous time t−1 to update the HMM parameters λ(t) at current time t. Based on λ(t), state estimation unit 605 uses a decoder to estimate a corresponding state sequence. The mask restoration unit 607 for restoring states to an object mask transforms the state sequence into an object mask $\Omega_h$(t), and stores the object mask. The delay buffer 609 propagates the object mask $\Omega_h$(t−1) at previous time t−1 to the parameter estimation unit 603.

Unlike the conventional methods to construct an HMM for each pixel, the present invention only constructs an HMM for an image and results in a binary object mask.

It is worth noting that in an actual object detection environment, the background area is larger than the foreground area. Therefore, in initializing the state probability, the initial state probability of the background is larger than the initial state probability of the foreground. In a simulation experiment of the present invention, 23 images are captured, and an HMM is constructed for an image 100. The initial state probability $π_1$ of background is 0.9, and the initial state probability $π_2$ of foreground is 0.1. In comparison with the conventional object detection techniques, the results show that the foreground is more stable and the background is clearer when using the present invention. The complete object mask can almost be extracted. Therefore, the present invention not only improves the robustness of the object mask, but also improves the clear background to further decrease the false detection. The detection rate of the present invention is also higher.

In addition, the simulation experiments for HMM procedure of the present invention is performed under scale=1 and scale=2. The results show that when scale=2, the method of the present invention will result in a more distinguishable object mask in comparison with scale=1.

Although the present invention has been described with reference to the preferred embodiments, it will be understood that the invention is not limited to the details described thereof. Various substitutions and modifications have been suggested in the foregoing descriptions, and others will occur to those of ordinary skill in the art. Therefore, all such substitutions and modifications are intended to be embraced within the scope of the invention as defined in the appended claims.

What is claimed is:

1. A method for object detection in an image plane, comprising the steps of:
   constructing a Hidden Markov Model (HMM) in an object detection system for an image, and initializing a plurality of HMM parameters;
   obtaining an object mask Ω(t) at current time through an object mask $106_h$(t−1) at previous time using a parameter estimation unit in said object detection system, and updating said plurality of HMM parameters of current time on a spatial domain of said image; and
   re-estimating said object mask Ω(t) at current time based on the updated plurality of HMM parameters using a state estimation unit in said object detection system and a decoding algorithm in said state estimation unit.

2. The method as claimed in claim 1, wherein said HMM is constructed with two states, background state $S_1$ and foreground state $S_2$, and two symbols, background symbol α and foreground symbol β.

3. The method as claimed in claim 2, wherein initializing said HMM parameters further includes setting probability $P_1$(x=α) that said foreground symbol occurs during a background situation, probability $P_1$(x=β) that said background symbol occurs during the background situation, an initial probability of states $S_1$ and $S_2$, and a state transition probability matrix {$a_{ij}$, i,j=1,2}, where $a_{ij}$ is a transition probability from state $S_i$ to state $S_j$.

4. The method as claimed in claim 3, wherein updating said plurality of HMM parameters further includes the steps of:
   obtaining said object mask Ω(t) by subtracting said object mask $\Omega_h$(t−1) at previous time t−1 from a foreground mask $\Omega_{f1}$(t) to form a binary mask; and
   approximating the probability of said object mask Ω(t) being a foreground symbol in a background state as ζ, that is, $P_1$(x=α)=ξ, where ξ denotes an occupy-ratio of the foreground symbol in said object mask Ω(t).

5. The method as claimed in claim 2, wherein re-estimating said object mask of current time further includes the steps of:
   reading a two-dimensional object mask Ω(t−1) at previous time t−1 in one-dimensional way;
   estimating a one-dimensional state $\Omega_{f1}$(x,y,t) at current time for a pixel (x,y) through said decoding algorithm, and considering a fusion part of the foreground and background symbols of $\Omega_{f1}$(x,y,t) as background if said fusion part matches a background statistic model; and
   transforming the estimated one-dimensional state $\Omega_{f1}$(x,y,t) to a two-dimensional object mask.

6. The method as claimed in claim 4, wherein said two-dimensional object mask at previous time is read with an original resolution.

7. The method as claimed in claim 4, wherein said two-dimensional object mask at previous time is a result of down-sampling input signals.

8. The method as claimed in claim 3, wherein setting said state transition probability matrix further includes setting $a_{ii}$>$a_{ij}$ when i≠j.

9. The method as claimed in claim 7, wherein said result of down-sampling input signals is used to estimate state sequence $\Omega'_h$(t), and said method further includes a step of up-sampling said state sequence $\Omega'_h$(t) to obtain said object mask Ω(t).

10. The method as claimed in claim 1, wherein said decoding algorithm is a Viterbi algorithm.

11. A system for object detection in an image plane, comprising:
   a Hidden Markov Model (HMM) coupled with an object segmentation unit for configuring a set of a plurality of HMM parameters represented by λ from an input image;
   a parameter estimation unit for obtaining a new object mask Ω(t) through an object mask $\Omega_h$(t−1) at previous time t−1 and updating said HMM parameters λ (t) at current time t;
   a state estimation unit for estimating a corresponding state sequence through a decoder based on said λ (t);
   a mask restoration unit for transforming said state sequence into an object mask $\Omega_h$(t), and storing said object mask $\Omega_h$(t); and
   a delay buffer for propagating said object mask $\Omega_h$(t−1) at previous time t−1 to said parameter estimation unit.

12. The system as claimed in claim 11, wherein said HMM includes parameters N, M, A, π, $P_1$ and $P_2$, and is represented as H:=(N,M,A,$\pi$,$P_1$, $P_2$), where N=2 is the number of states including background state $S_1$ and foreground state $S_2$;

M=2 is the number of symbols including foreground symbol $\beta$ and background symbol $\alpha$;

A={$a_{ij}$,i,j=1,...N} is a state transition probability matrix, $a_{ij}$ is a transition probability from state i to state j;

$\pi$={$\pi_1$, ..., $\pi_N$}, $\pi_1$ is an initial state probability of state i; and $P_1$ and $P_2$ are probability density functions for said background state $S_1$ and said foreground state $S_2$, respectively.

13. The system as claimed in claim 11, wherein said decoder is a Viterbi decoder.

14. The system as claimed in claim 11, wherein said object mask $\Omega_h(t)$ is a binary image data.

* * * * *